US009083996B2

(12) United States Patent
Zheng et al.

(10) Patent No.: US 9,083,996 B2
(45) Date of Patent: Jul. 14, 2015

(54) REMOTE MONITORING METHOD FOR SMART TV, AND SMART TV SYSTEM (71) Applicant: MStar Semiconductor, Inc., Hsinchu County (TW)

(72) Inventors: Ren-Zhen Zheng, Hsinchu County (TW); Jian-Qun Jiang, Hsinchu County (TW)

(73) Assignee: MSTAR SEMICONDUCTOR, INC., Hsinchu County (TW)

( * ) Notice: Subject to any disclaimer, the term of this patent is extended or adjusted under 35 U.S.C. 154(b) by 139 days.

(21) Appl. No.: 13/723,620

(22) Filed: Dec. 21, 2012

(65) Prior Publication Data
US 2013/0247079 A1 Sep. 19, 2013

(30) Foreign Application Priority Data

Mar. 16, 2012 (CN) .......................... 2012 1 0070817

(51) Int. Cl.
*H04N 21/24* (2011.01)
*H04N 21/41* (2011.01)
*H04N 21/442* (2011.01)

(52) U.S. Cl.
CPC ....... *H04N 21/2407* (2013.01); *H04N 21/4126* (2013.01); *H04N 21/4424* (2013.01); *H04N 21/44231* (2013.01)

(58) Field of Classification Search
None
See application file for complete search history.

(56) References Cited

U.S. PATENT DOCUMENTS

| 8,269,663 | B2 * | 9/2012 | Sotomaru | 341/176 |
| 2003/0126612 | A1 * | 7/2003 | Ikeda et al. | 725/105 |
| 2004/0199525 | A1 * | 10/2004 | Matsuda et al. | 707/100 |
| 2012/0278825 | A1 * | 11/2012 | Tran et al. | 725/13 |
| 2013/0152135 | A1 * | 6/2013 | Hong et al. | 725/51 |

FOREIGN PATENT DOCUMENTS

| CN | 1599295 A | 3/2005 |
| CN | 101924651 A | 12/2010 |

OTHER PUBLICATIONS

China Patent Office, "Office Action", Nov. 5, 2013.
State Intellectual Property Office of the People's Republic of China, "Office Action", Jul. 22, 2014.

* cited by examiner

*Primary Examiner* — Mark D Featherstone
(74) *Attorney, Agent, or Firm* — WPAT, PC; Justin King (57) ABSTRACT

A remote monitoring method and apparatus for a smart TV and a smart TV system are provided. Real-time status information of the smart TV and/or an external device is retrieved and transmitted to a remote device, such that the remote device in real-time monitors the smart TV and/or the external device according to the real-time status information. Real-time monitoring on smart appliances in a smart appliance control system can be achieved without requiring additional dedicated devices, thereby lowering production costs and maintenance costs as well as saving resources and enhancing user experiences.

6 Claims, 3 Drawing Sheets

REMOTE MONITORING METHOD FOR SMART TV, AND SMART TV SYSTEM

This application claims the benefit of People's Republic of China application Serial No. 201210070817.7, filed Mar. 16, 2012, the subject matter of which is incorporated herein by reference.

BACKGROUND OF THE INVENTION

1. Field of the Invention

The invention relates in general to a smart TV field, and more particularly to a remote monitoring method and a smart TV system.

2. Description of the Related Art

The number of application devices connected to a playback apparatus such as a smart TV continuously expands along with ever-progressing technology developments. For example, application devices may include computers, setup boxes, DVD players, microphones, and sound systems, and the number and type of devices which may connect to a smart TV become more and more divergent as technology evolves.

In the field of smart terminals, through a smart appliance control system, a smart TV is enabled to inquire and retrieve statuses, applications, and services in operation along with stored resources and information of externally connected devices connected to the smart TV in real-time. The smart TV is further capable of mutual control via "triple play" (a telecommunication network, a television broadcasting network, and the Internet).

However, a current smart appliance control system supports only a simple monitoring function, e.g., controlling activation (on/off) of an external device or inquiring a temperature status of an external device. Meanwhile, in addition to a dedicated apparatus or server, a current smart appliance control system further needs a large initial investment, high operation maintenance costs, and necessary upgrades from time to time.

Therefore, there is a need for a solution for monitoring a smart TV remotely without involving additional devices.

SUMMARY OF THE INVENTION

The invention is directed to a remote monitoring method for monitoring a smart TV and a smart TV system as a solution for monitoring a smart TV without involving additional devices.

According to an aspect of the disclosure, a remote monitoring method for a smart TV system is provided. The remote monitoring method includes steps of: retrieving real-time status information of the smart TV and/or an external device and transmitting the real-time status information to a remote device, such that the remote device monitors a real-time status of the smart TV and/or the external device.

In one embodiment, the remote monitoring method further includes: receiving a control command transmitted from the remote device, and performing an operation control according to the control command.

In one embodiment, the remote monitoring method further includes: receiving control request information transmitted from the remote device according to the real-time status information, and transmitting an operation permission to the remote device in response to the control request information.

In one embodiment, the remote monitoring method further includes: receiving detection request information transmitted from the remote device, wherein the detection request information includes a hop count corresponding to a connection level of the external device; and retrieving the real-time status information of the external device corresponding to the hop count.

According to another aspect of the disclosure, a smart TV is provided. The smart TV includes: a device sensing module, for retrieving real-time status information of the smart TV and/or an external device; and a status information transmission module, for transmitting the real-time status information to a remote device, such that the remote device monitors a real-time status of the smart TV and/or the external device according to the real-time status information.

The status information transmission module further receives control request information replied from the remote device according to the real-time status information. The smart TV further includes a permission retrieval module for transmitting an operation permission to the remote device in response to the control request information.

The status information transmission module further receives a control command transmitted from the remote device. The smart TV further includes a control module for performing an operation control according to the control command.

The status information transmission module further receives detection request information transmitted from the remote device. The detection request information includes a hop count corresponding to a connection level of the external device. The control module includes a level control unit for controlling the device sensing module to retrieve the real-time status information of the external device corresponding to the hop count.

According to another aspect of the disclosure, a smart TV system is provided. The smart TV system includes a smart TV and a remote device. The smart TV includes: a device sensing module, for retrieving real-time status information of the smart TV itself and/or an external device; and a status information transmission module, for transmitting the real-time status information to the remote device, such that the remote device monitors a real-time status of the smart TV and/or the external device according to the real-time status information. The remote device includes: a remote information transmission module, for transmitting detection request information to the status information transmission module, and receiving the real-time status information of the smart TV and/or the external device replied from the device sensing module according to the detection request information; and a display module, for displaying the real-time status information received by the remote information transmission module.

The remote device further includes: an operation module, for receiving a control request command entered by a user, generating control request information according to the control request command, and transmitting the control request information to the smart TV via the remote information transmission module. The smart TV further includes: a permission retrieval module, for transmitting an operation permission to the remote information transmission module of the remote device in response to the control request information.

The remote information transmission module further receives the control command entered by the user and transmits the control command to the status information transmission module. The smart TV further includes: a control module, for performing an operation control according to the control command received by the status information transmission module.

With the present disclosure, real-time inquiry, retrieval and detection of real-time status information of an external device or network connected to the smart TV are implemented. For example, statuses, applications, and services in operation, and stored resources and information can all be inquired through the remote device. Thus, real-time and transparent smart detections can be achieved without requiring additional dedicated devices. In addition to lowering production costs and maintenance costs, the disclosure is capable of in real-time monitoring smart appliances in a smart appliance control system as well as saving resources and enhancing user experiences.

The above and other aspects of the invention will become better understood with regard to the following detailed description of the preferred but non-limiting embodiments. The following description is made with reference to the accompanying drawings.

DETAILED DESCRIPTION OF THE INVENTION

Embodiments are given below with the accompanying drawings to describe details of the disclosure. In the descriptions, for example, communication connection means for information transmission, reception and/or retrieval may include wired or wireless modes, e.g., RJ45, RS232, WiFi, Bluetooth, Zigbee, infrared and 3G; a smart TV, and various devices involved may be smart DTVs, computers, and setup boxes; an operating system may be Android, iOS, Windows Mobile, and Windows CE; remote devices involved may be cell phones and tablet computers with an operating system such as Android, iOS, Windows Mobile, and Windows CE. Details associated with the above can be easily appreciated by a person having ordinary skill in the art, and shall be omitted herein. The embodiments below are for explaining the disclosure and are not to be construed as limitations to the scope of the disclosure.

Figure 1:
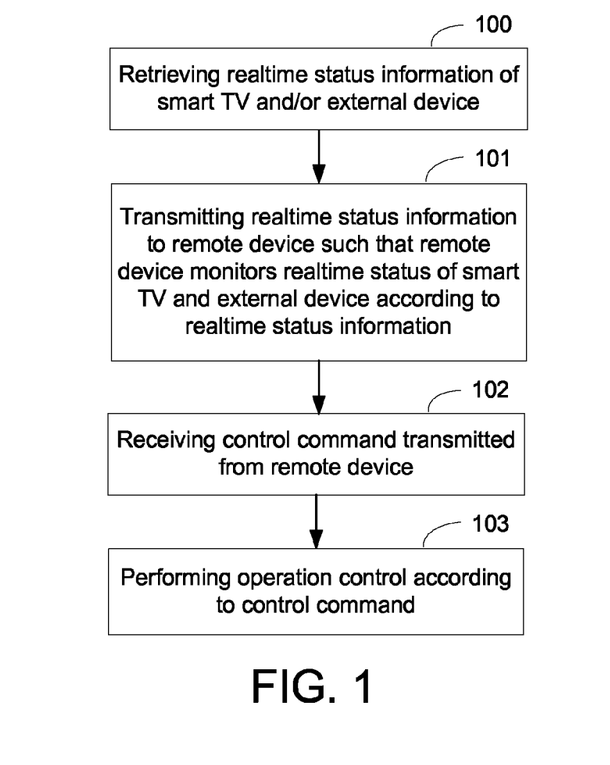
FIG. 1 is a flowchart of a remote monitoring method for a smart TV at a smart TV end according to an embodiment of the disclosure.

Referring to FIG. 1, a remote monitoring method for a smart TV according to one embodiment includes the following steps.

In step 100, real-time status information of the smart TV and/or an external device is retrieved.

The smart TV may record its own real-time status information in advance and/or record real-time status information to an external device to facilitate a remote device to perform a quick retrieval. More specifically, the recording process may include: the smart TV and/or the external device in real-time records statues, stored resources as well as applications and services of the smart TV and/or the external device, information of various devices connected through an interface, and statuses and information of remotely connected systems and devices. In subsequent steps, the smart TV periodically or from time to time requests for a retrieval of the real-time status information of the smart TV itself and/or the external device. The external device feeds various types of real-time status information in real-time recorded to the smart TV after receiving the request.

In step 100, the retrieved real-time status information may also include status information of the smart TV itself, status information of a connected device, status information of a connected network, and status information of a remote device, e.g., a camera, a microphone, a speaker, a DVD player, a Universal Serial Bus (USB), an audio/video input, a connected network, a connected cable TV, a temperature, volume, an on/off status, a signal source format and a playback bit rate of the external device, an Internet Protocol (IP), a network bandwidth, and program channel information of a connected network. Associated details are known to a person having ordinary skill in the art and shall be omitted herein for the sake of bevity.

Assume that the real-time status information is the status information of the smart TV itself. A system of the smart TV may retrieve information including its own status, stored resources, applications and services in operation according to an "object+status+subsidiary information" format. For example, a target object may include applications, system services, TV programs, and music videos, and may be defined and expanded according to a specific product. The status may be storage with respect to stored resources; listening to or watching with respect to resources of broadcasts, TV programs, audios and videos, graphics and text files; operations with respect to telephone services, mail services, and reminder services.

The real-time status information of the smart TV may further include subsidiary information, e.g., information of a program being watched, an introduction on a movie and a file name. A format of the subsidiary information may be expandable, and may expressed in a list of "information type 1: information content 1; information type 2: information content 2; . . . ". The information type represents a type of the subsidiary information, e.g., a name, a font, a size, a channel logo, or volume of the subsidiary information. The information content represents contents corresponding to the information type, e.g., a file name, an actual size of the font, a measurement of the size, a channel number or channel name, a size of the volume. Associated details can be easily appreciated by a person having ordinary skill in the art, and shall be omitted herein for the sake of brevity.

Assume that the real-time status information is the status information of a connected device or the status information of a connect network. The system of the smart TV may also retrieve information of various connected devices including a connected USB, a DVD player, a microphone, or a network via an interface. For example, information "camera+ON+size: 352*288; format: YUV411: format: RGB24" indicates that a camera supporting Common Intermediate Format (CIF) sampling format is connected (due to the pixel size), and the sampling format includes YUV4:1:1 and RGB24 bit colors. With respect to the status information of a connected network, a type, bandwidth, and a connection status of the network can be recorded. Associated details are known to a person having ordinary skill in the art, and shall be omitted herein for the sake of brevity.

Assume that the real-time status information includes status information of a remote device. The system of the smart TV may serve as a service element for retrieving or detecting a status, stored resources, applications, or services in operation of the remote device. Details of the retrieval process can be referred from descriptions associated with the status information of the smart TV, and the status information of the connected device and connected network to the smart TV, and shall be omitted herein for the sake of brevity.

With respect to the above transmission and reception process of different types of real-time status information, the system of the smart TV may program associated configurations in advance. For example, detection request information "DeviceStatusReq+hop count" is periodically transmitted to the connected remote device or network to request for a retrieval of the real-time status information. The hop count is for controlling a spread distance of the status request information of the remote device, i.e., the hop count corresponds to a connection level of the external device. Referring to FIG. 1, one embodiment of a remote monitoring method for a smart TV at a smart TV end which includes retrieval of real-time status information at a smart TV (Step 100) is shown. During the process of retrieving the real-time status information, the smart TV needs to retrieve the real-time status information of the external device at the corresponding level according the corresponding hop count. For example, in an actual connection process, it is possible that a part or all of the remote devices are connected to "child remote devices", which further connect to "grandchild remote devices", and so forth. According to the embodiment, the status of a multi-level remote device can be inquired and detected. Further, an inquiry and detection range can be defined through setting a maximum inquiry and detection level of the hop count.

When a remote device at a particular level receives the information "DeviceStatusReq+hop count", the hop count is first decreased by 1. When the remaining hop count is non-zero, the information is forwarded to other "child remote devices". At the same time, the status information fed back from the "child remote devices" is received and combined, and is reported back to a parent remote device up one level. It should be noted that the parent, child, and grandchild remote devices are relative narrations, and may be also level relations in a sequential form from a same level. Various modifications can be made by a person having ordinary skill in the art. In an embodiment, an uncontrolled total network device detection and inquiry can be implemented. Further, after retrieving the real-time status information, the real-time status information may also be recorded and stored to a corresponding status information database.

In step 101, the real-time status information is transmitted to the remote device, such that the remote device monitors the real-time status of the smart TV and/or the external device.

After receiving the status detection request information and obtaining the real-time status information of various remote devices and networks, the smart TV collects and feeds the real-time status information to the remote device for monitoring. A detailed process of step 101 includes the following processes.

In process 1, the remote device periodically and initiatively transmits the information "DeviceStatusReq+hop count" to the smart TV, and transmits the detection request information for inquiring the device status to the smart TV.

In process 2, after receiving the real-time status information fed back from all the connected remote devices or networks, the smart TV transmits information "DeviceStatusReq+device code+device status stream" to feedback the status or information of the requested smart TV or connected devices and networks.

The smart TV may also initiatively transmit the information "DeviceStatusReq+device code+device status stream" to report to the remote device, so as to display various types of real-time status information to a user or subsequent operations via the remote device. Associated details are known to a person having ordinary skill in the art, and shall be omitted herein.

After the external device or network of the smart TV in the system receives the request of the information "DeviceStatusRsp+hop count", the following processes can be performed.

In process 1, the hop count is decreased by one.

In process 2, a value of the hop count is determined. The information "DeviceStatusRsp+hop count" is forwarded to other "child remote devices" when the value of the hop count is greater than 0, or else the information is no longer forwarded to the "child remote devices" when the hop count is equal to 0, and process 3 is performed. Process 2 is an embedded process, and a predetermined level is inquired according to the value of the hop count. An uncontrolled total network device detection and inquiry can be implemented.

In process 3, the real-time status information fed back by all the "child remote devices" is received.

In process 4, the real-time status information of the remote device itself or various "child remote devices" connected via an interface is in real-time recorded, and is fed back to the smart TV through the information "DeviceStatusReq+device code+device status stream". The device code may be serial numbers, barcodes, two-dimensional codes, MAC addresses, and/or IP addresses of the remote devices. The device status stream is sequence information "object 1+status 1+subsidiary information 1; object 2+status 2+subsidiary information 2; . . . ." recording statuses of the devices. Associated details are known to a person having ordinary skill in the art, and shall be omitted herein for the sake of brevity.

In a preferred embodiment, after retrieving the above real-time status information fed back, the smart TV stores the real-time status information to a database. In another embodiment, when the hop count is set to 0, it means that the information "DeviceStatusReq+hop count" is not transmitted as default, and only the device statuses of the smart TV itself and other external devices are collected.

Similarly, for example, the real-time status information may also be initiated and retrieved by the smart TV, or may be initiatively reported by the external devices or networks.

In step 102, a control command transmitted from the remote device is received.

In step 102, for example, the remote device performs the following processes when an operation control is desired on a particular device.

In process 1, the remote device receives the real-time status information and the corresponding device list. Devices on the device list are inclusive of the smart TV itself.

In process 2, the target device for the operation control is selected from the device list.

In process 3, it is determined whether an operation permission is required. When the operation permission is required, operation control information is transmitted to the smart TV to obtain the operation permission for controlling the device. When the target of the operation control is the smart TV, the operation permission is directly requested from the smart TV. When the target of operation control is an external device of the smart TV, the control request information is forwarded via the smart TV to the external device to obtain the operation permission. When the operation permission is not required, a control command is directly transmitted to perform the operation control.

In process 4, after obtaining the operation permission, a control command is transmitted to the smart TV to implement the operation control on the target device.

In step 103, the operation control is performed according to the control command.

For example, details of step 103 may include the types described below.

In a first type, a user operates on the remote device, such as swinging, vibrating, clicking, and touching. In a second type, the control command is formed at the remote device according to a user action. In a third type, the control command is transmitted by the remote device, e.g., "ActionReq+command+device code". In a fourth type, after receiving the control command and obtaining the operation permission, the smart TV forwards the control command to the external device or network, or various external devices are turned on/off or to perform another corresponding operation when the device code is executing the control command. For example, an application, a game, or USB interface status of a joint developer of the smart TV is controlled and activated.

Further, the process that the remote device transmits the control request information and the control command to the smart TV are complementary processes. At the remote device end, the processes include: the remote device transmitting the detection request signal to the smart TV; the remote device receiving the real-time status information of the smart TV and/or the external devices of the smart TV transmitted from the smart TV according to the detection request information; displaying the real-time status information to the user; receiving a control request command entered by the user, and generating the control request information according to the control request command; transmitting the control request information to the smart TV; receiving the operation permission replied from the smart TV in response to the control request information; and transmitting the control command to the smart TV, such that the smart TV performs the operation control according to the control command.

According to an embodiment, steps 102 and 103 may be selectively performed. That is to say, the remote monitoring method for a smart TV according to an embodiment of the disclosure may include only steps 100 and 101 for implementing the monitoring operation.

When controlling the smart TV or an associated external device through the remote device is desired, the control command may be transmitted by the remote device to the smart TV or the associated external device.

In an alternative embodiment of the disclosure, the remote monitoring method for a smart TV may further include an optional operation of: the remote device providing remote device detection services for other applications and transmitting the real-time status information to another remote device.

Figure 2:
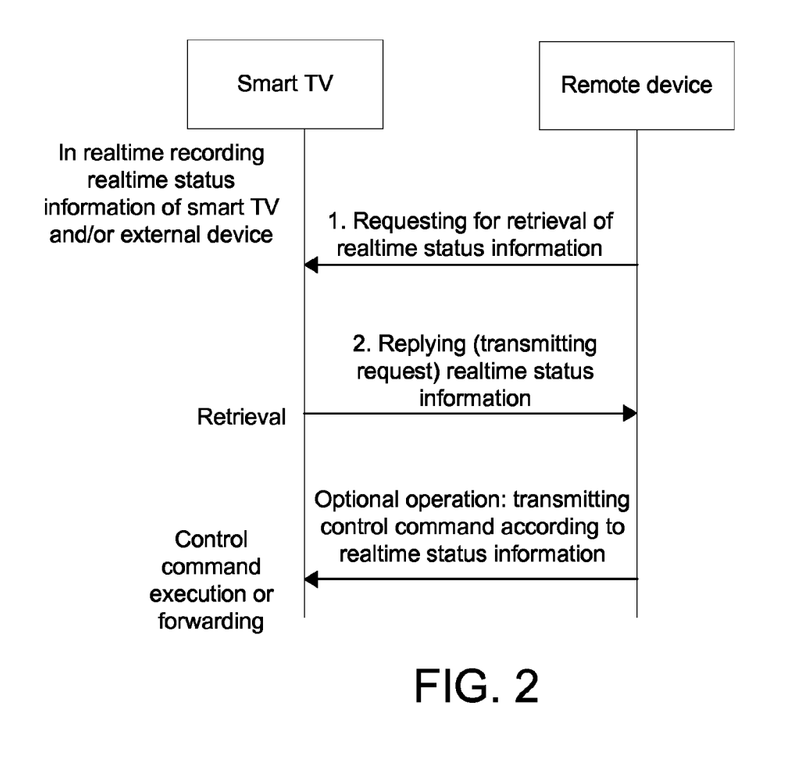
FIG. 2 is a schematic diagram illustrating information exchange in a remote monitoring method for a smart TV according to an embodiment of the disclosure.

FIG. 2 shows a schematic diagram of processes after the smart TV in real-time records its own real-time status information and/or the real-time status information of an external device.

In step 1, the detection request information transmitted from the remote device is received. At this point, the remote device requests the smart TV for a retrieval of the real-time status information.

In step 2, after the real-time status information in the smart TV is retrieved, the real-time status information is fed back to the remote device. For example, the real-time status information may also be initiatively transmitted to the remote device from time to time.

Further, the remote device may monitor or perform an optional operation according to the real-time status information, or transmit the control command to the smart TV according to the real-time status information. Next, for example, the smart TV performs the operation control according to the control command of the remote device or forwards the control command of the remote device to an external device or network, or other joint developer applications and games for corresponding operation controls.

The schematic diagram depicting the information exchange according to the embodiment is an exemplary illustration. Operation details can be referred from the descriptions of the embodiment associated with FIG. 1, and shall be omitted herein as being easily appreciated by a person having ordinary skill in the art for the sake of brevity.

Figure 3:
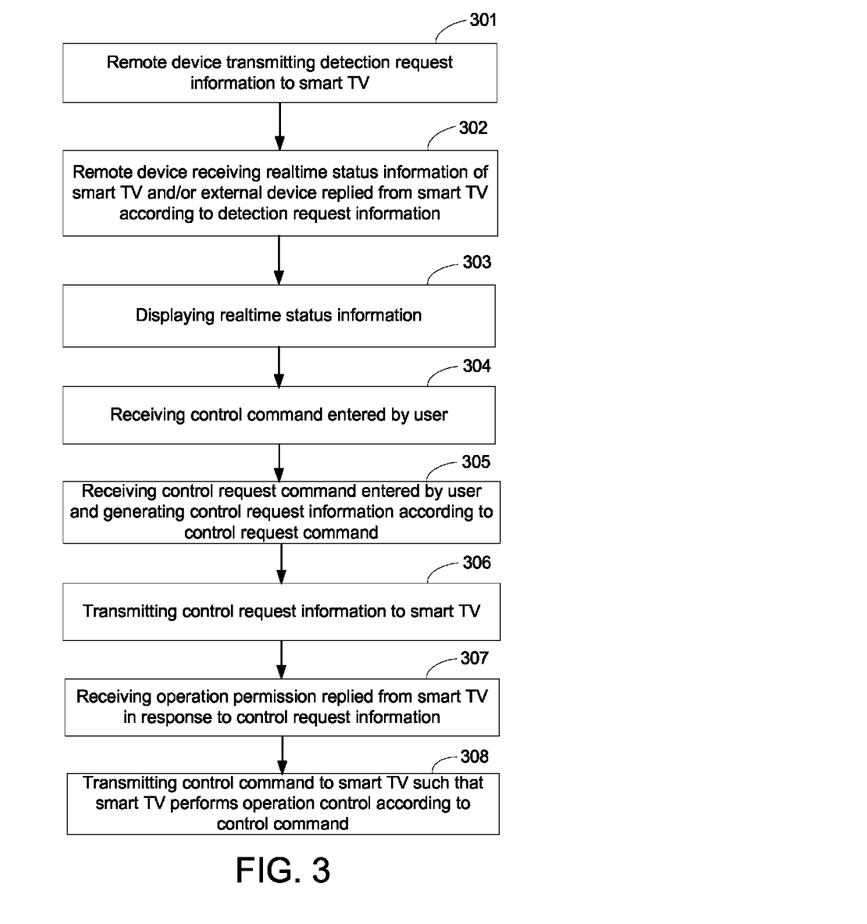
FIG. 3 is a flowchart of a remote monitoring method for a smart TV at a remote device end according to an embodiment of the disclosure.

FIG. 3 shows a flowchart of the above remote monitoring method for a smart TV at a remote device end according to an embodiment of the present invention.

In step 301, the remote device transmits the detection request information to the smart TV.

The remote device may be connected to the smart TV by wired or wireless connection means, and transmits the detection request information such as "DeviceStatusReq+hop count" to the smart TV in order to perform subsequent information transmissions. Associated details can be appreciated by a person having ordinary skill in the art with reference to the foregoing descriptions on "DeviceStatusReq+hop count", and shall be omitted herein for the sake of brevity.

In step 302, the remote device receives the real-time status information of the smart TV and/or the external device of the smart TV replied from the smart TV according to the detection request information.

After receiving the detection request information including "DeviceStatusReq+hop count", the smart TV retrieves the real-time status information of the corresponding external device at the level corresponding to the hop count, and replies the real-time status information to the remote device.

In step 303, the real-time status information is displayed to the user.

The real-time status information may include "DeviceStatusRsp+device code+device status stream" and a device list, which are then displayed to the user by the remote device. The user may also select a device in the device list and inquire more detailed real-time status information of the selected device. Associated details can be appreciated to a person having ordinary skill in the art, and are omitted herein.

In step 304, the control command entered by the user is received.

As previously described, when the user selects from the real-time status information and the corresponding external device from the device list and/or the smart TV, a control command is generated. The remote device may then receive the control command via a touch screen or through other means.

In step 305, a control request command entered by the user is received, and the control request information is generated according to the control request command.

When the user wishes to perform a specific operation, the process of requesting for the operation permission for the control operation between the remote device and the smart TV and/or the external device can be referred from foregoing descriptions, and shall be omitted herein for the sake of brevity.

In step 306, the control request information is transmitted to the smart TV.

In step 307, the operation permission replied from the smart TV in response to the control request information is received.

The operation permission may be with respect to the smart TV and/or the external device, e.g., for controlling a connection status of a connected network.

In step 308, the control command is transmitted to the smart TV, such that the smart TV performs the operation control according to the control command.

As previously described, the control command may also be forwarded to the external device via the smart TV to perform a subsequent operation, e.g., operating a game, disconnecting a network, and accessing resources connected by USB.

Figure 4:
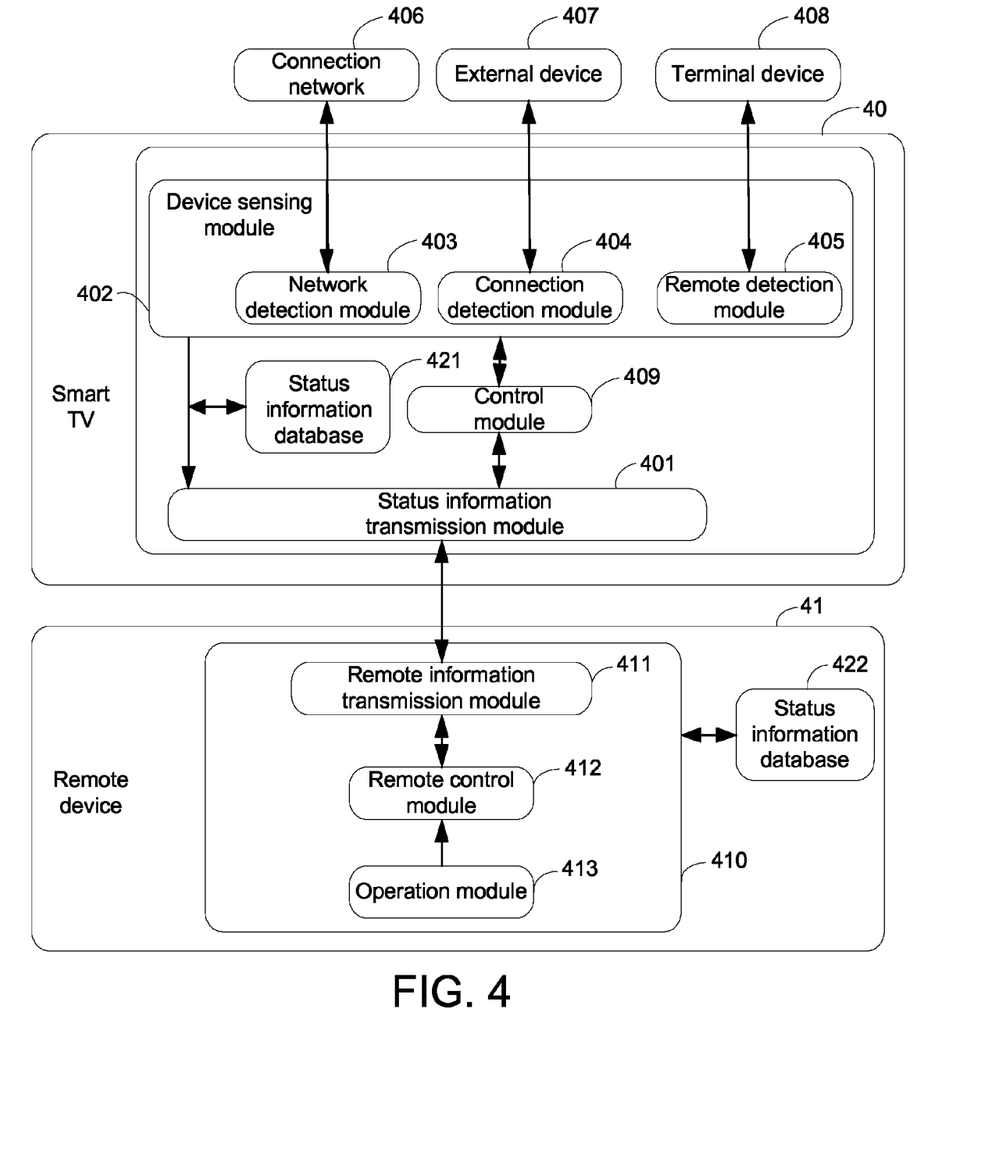
FIG. 4 is a system block diagram of a smart TV system according to an embodiment of the disclosure.

FIG. 4 shows a system block diagram of a smart TV system according to one embodiment of the disclosure. Referring to FIG. 4, a smart TV 40 of a system includes: a status information transmission module 401; a device sensing module 402, including a network detection module 403, a connection detection module 404 and a remote detection module 405; a connection network 406, connected to the network detection module 403; an external device 407, connected to the connection detection module 404; and a terminal device 408, connected to the remote detection module 405. The smart TV 40 may further include a control module 409 for controlling the above function modules, and a status information database 421 for storing real-time status information.

During an operation process, the device sensing module 402 retrieves real-time status information of the smart TV 40 and/or an external device. The status information transmission module 401 transmits the real-time status information retrieved by the device sensing module 402 to a remote device 41, such that the remote device 41 monitors a real-time status of the smart TV 40 and/or the external device 407 according to the real-time status information. A control command replied from the remote device 41 according to the real-time status information is received via the status information transmission module 401, such that the control module 409 performs an operation control according to the control command.

Further, the smart TV 40 may also include a permission retrieval module (not shown). When the status information transmission module 401 receives control request information replied form the remote device 41 according to the real-time status information, the permission retrieval module transmits an operation permission to the remote device in response to the control request information. The remote device 41 then transmits the control command to the smart TV 40 according to the operation permission, and accordingly performs the operation control on the smart TV 40.

As previously described, in order to provide levels of the real-time status information retrieved, a level control unit may be further provided. The device sensing module 402 is controlled by the level control unit to retrieve the real-time status information of the external device corresponding to the hop count. The device sensing module 402 then retrieves the real-time status information of the external device or a connected network within the level.

The status information of the smart TV itself may be directly retrieved by the device sensing module 402; the connected device status information of the external device 407 may be retrieved by the connection detection module 404; the connected network status information of the connected network 406 may be retrieved through the network detection module 403; and the remote device status information of the terminal device 408 may be retrieved through the remote detection module 405. Associated details can be appreciated by a person having ordinary skill in the art, and shall be omitted herein for the sake of brevity.

In the embodiment, for example, the remote device 41 in FIG. 4 includes a display module, a remote detection application 410, and a status information database 422. The remote detection application 410 may include a remote information transmission module 411, a remote control module 412, and an operation module 413 integrated therein.

In practice, the remote information transmission module 411 transmits detection request information to the smart TV 40, receives real-time status information replied from the smart TV according to the detection request information, transmits control request information to the smart TV 40 according to the real-time status information, and/or the operation permission replied from the smart TV 40 in response to the control request information. The remote information transmission module 411 further receives a control command entered by a user, and transmits the control command to the smart TV 40, such that the smart TV 40 performs an operation control according to the control command. Further, the real-time status information is displayed to the user via the display module to allow the user to perform turning on/off, selection, or other operations.

The remote control module 412 controls and coordinates operations of the remote information transmission module 411 and the operation module 413.

The operation module 413 receives a control request command entered by the user, and generates the control request information according to the control request command. The control request information is transmitted to the smart TV 40 via the remote information transmission module 411. The operation permission replied from the smart TV 40 in response to the control request information is received. In the subsequent process of the operation control performed by the user, the retrieval process can be implemented by the operation module 413 to generate the control command. Associated details can be appreciated by a person having ordinary skill in the art, and shall be omitted herein.

Operational details of the remote device 41 can be referred from corresponding descriptions associated with FIG. 3, and shall be omitted herein as being easily appreciated by a person having ordinary skill in the related art for the sake of brevity.

As previously described, the operation process of the smart TV 40 includes the following steps. The device sensing module 402 retrieves the real-time status information of the smart TV 40 itself and/or the external device. The status information transmission module 401 then transmits the real-time status information retrieved by the device sensing module 402 to the remote device 41 to monitor the real-time status.

The operation process of the remote device 41 includes the following steps. The remote information transmission module 411 transmits the detection request information to the status information transmission module 401, receives the real-time status information replied from the status information transmission module 401 according to the detection request information, and displays the real-time status information to the user via the display module.

In an alternative embodiment, the remote device 41 further includes the operation module 413. The operation module 413 receives the control request command entered by the user, generates the control request information according to the control request command, transmits the control request information to the smart TV 40 via the remote information transmission module 411, and receives the operation permission replied from the smart TV 40 in response to the control request information. Correspondingly, the smart TV 40 further includes the control module 409. The control module 409 correspondingly performs the operation control according to the control command received by the status information transmission module 401.

During the retrieval process for the operation permission, the remote device 41 receives the control request command entered by the user via the operation module 413, generates the control request information according to the control request command, and transmits the control request information to the smart TV 40 via the remote information transmission module 411. The control module 409 transmits the operation permission to the remote information transmission module 411 of the remote device via the permission retrieval module.

Operational principles of the smart TV system can be referred from descriptions associated with FIG. 1, the smart TV 40 and the remote device 41, and shall be omitted herein as being easily appreciated by a person having ordinary skill in the related art for the sake of brevity.

With the descriptions of the above embodiments, it is demonstrated that real-time inquiry, retrieval, and detection of real-time status information of an external device or network connected to the smart TV 40 are implemented. For example, statuses, applications and services in operation, and stored resources and information can all be inquired through the remote device 41. Thus, with the preferred embodiments of the disclosure, real-time and transparent smart detections can be achieved without requiring additional dedicated devices. In addition to lowering production costs and maintenance costs, the disclosure is capable of in real-time monitoring smart appliances in a smart appliance control system as well as saving resources and enhancing user experiences.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A remote monitoring method for a smart TV, wherein the smart TV is connected to a plurality of external devices, comprising:
    retrieving real-time status information of the smart TV and an external device, wherein the external device is connected to the smart TV at a particular connection level, wherein the real-time status information is recorded in advance to facilitate quick retrieval;
    transmitting the real-time status information to the remote device by the smart TV in response to detection request information transmitted from the remote device, such that the remote device monitors a real-time status of the smart TV and the external device;
    receiving a control command transmitted from the remote device; and
    performing an operation control according to the control command;
    wherein the detection request information comprises a hop count corresponding to the particular connection level of the external device to facilitate the retrieval of the real-time status information of the external device; and
    wherein the hop count is decreased by one when the detection request information is received by the smart TV or one of plurality of external devices, and the detection request information is further forwarded to an adjacent external device when a remaining hop count is non-zero.

2. The remote monitoring method according to claim 1, further comprising:
    receiving control request information replied from the remote device according to the real-time status information; and
    transmitting an operation permission to the remote device in response to the control request information.

3. A smart TV, wherein the Smart TV is connected to a plurality of external devices, comprising:
    a device sensing module, for retrieving real-time status information of the smart TV and an external device, wherein the external device is connected to the smart TV at a particular connection level, wherein the real-time status information is recorded in advance to facilitate quick retrieval;
    a status information transmission module, for transmitting the real-time status information to a remote device in response to detection request information transmitted from the remote device, such that the remote device monitors a real-time status of the smart TV and the external device, the status information transmission module further receives a control command transmitted from the remote device;
    a control module, for performing and operation control according to the control command;
    wherein the detection request information comprises a hop count corresponding to the particular connection level of the external device to facilitate the retrieval of the real-time status information of the external device;
    wherein the status information transmission module further receives detection request information transmitted from the remote device, the control module further comprises a level control unit, for controlling the device sensing module to retrieve the real-time status information of the external device corresponding to the hop count;
    wherein the hop count is decreased by one when the detection request information is received by the smart TV or one of plurality of external devices, and the detection request information is further forwarded to an adjacent external device when a remaining hop count is non-zero.

4. The smart TV according to claim 3, wherein the status information transmission module further receives control request information replied from the remote device according to the real-time status information; the smart TV further comprising:
    a permission retrieval module, for transmitting an operation permission to the remote device in response to the control request information.

5. A smart TV system, comprising:
    a smart TV, wherein the Smart TV is connected to a plurality of external devices, comprising:
        a device sensing module, for retrieving real-time status information of the smart TV and an external device, wherein the external device is connected to the smart TV at a particular connection level, wherein the real-time status information is recorded in advance to facilitate quick retrieval;
        a status information transmission module, for transmitting the real-time status information to a remote device in response to detection request information transmitted from the remote device, such that the remote device monitors a real-time status of the smart TV and the external device, the status information transmission module further receives a control command transmitted from the remote device;
        a control module, for performing and operation control according to the control command;
        wherein the detection request information comprises a hop count corresponding to the particular connection level of the external device to facilitate the retrieval of the real-time status information of the external device;
        wherein the status information transmission module further receives detection request information transmitted from the remote device, the control module further comprises a level control unit, for controlling the device sensing module to retrieve the real-time status information of the external device corresponding to the hop count;

wherein the hop count is decreased by one when the detection request information is received by the smart TV or one of plurality of external devices, and the detection request information is further forwarded to an adjacent external device when a remaining hop count is non-zero; and a remote device, comprising:

a remote information transmission module, for transmitting detection request information to the status information transmission module, and receiving the real-time status information of the smart TV and the external device replied from the device sensing module according to the detection request information; and a display module, for displaying the real-time status information received by the remote information transmission module.

6. The smart TV system according to claim 5, wherein the remote device further comprises:

an operation module, for receiving a control request command entered by a user, generating control request information according to the control request command, and transmitting the control request information to the smart TV via the remote information transmission module; and the smart TV further comprises:

a permission retrieval module, for transmitting an operation permission to the remote information transmission module of the remote device in response to the control request information.

* * * * *